3,663,456
ZEOLITE A SYNTHESIS
Lawrence L. Upson, Wallingford, Pa., and Ronald T. Wood, Wilmington, Del., assignors to Air Products and Chemicals, Inc., Philadelphia, Pa.
No Drawing. Filed Nov. 17, 1969, Ser. No. 877,440
Int. Cl. C01b 33/28
U.S. Cl. 252—455 Z 2 Claims

ABSTRACT OF THE DISCLOSURE

Kaolin is calcined at a severity sufficient to prepare amorphous de-exothermed kaolin substantially free from mullite. A mixture of about 4.3 parts of such de-exothermed kaolin and 1 part of alumina alpha trihydrate is prepared and dispersed in a sodium hydroxide solution at ambient temperature. The freshly prepared solution is heated to about 100° C. and maintained at hot aging conditions for from about 10 to about 20 hours, to prepare a product comprising significant amounts of Zeolite A in an aluminosilicate matrix.

GENERAL BACKGROUND OF THE INVENTION

As explained in Kumins et al. 2,544,695, Howell 3,114,603, and Haden et al. 2,992,068, Zeolite A may be prepared by hot aging of a nutrient comprising metakaolin and aqueous sodium hydroxide. Such metakaolin is prepared by calcining kaolin at a temperature sufficient to bring about dehydration, the calcination being within the range from about 550° C. to 950° C. for a period from 1 to 3 hours. As explained in Haden et al. 3,391,994, sodium faujasite can be prepared by the combination of ambient aging and hot aging of an aqueous alkaline dispersion of de-exothermed kaolin, prepared by calcination above about 950° C.

SUMMARY OF THE INVENTION

In accordance with the present invention, 1 part of alumina alpha trihydrate is mixed with about 4.3 parts of de-exothermed kaolin to provide a mixture in which the unit mol ratio of silica to alumina is about 1.5. This mixture is dispersed in about 6.1 to about 7.1 parts of aqueous alkaline solution per part of alumina alpha trihydrate. The aqueous alkaline solution has a weight ratio of water to sodium hydroxide of about 5 to 1 so that the sodium hydroxide concentration is about 16.7%. The freshly prepared nutrient, without any significant aging at ambient temperature, is heated to about 100° C. and maintained at about 100° C. for from about 10 to about 20 hours to provide a product in which a significant amount of Zeolite A is distributed throughout an aluminosilicate matrix.

It is surprising that de-exothermed kaolin, which is described in the literature as a precursor for faujasite preparation, should be suitable for the preparation of Zeolite A. Howell, 3,114,603, column 5, lines 4 to 13, indicates that the metakaolin should be prepared at a temperature below 850° C., significantly lower than is often set as the maximum temperature for metakaolin preparation, if Zeolite A production is contemplated. The combination of alumina alpha trihydrate and de-exothermed kaolin is a precursor for one of the most rapid syntheses of sodium faujasite that has been developed. It is surprising that such a precursor leads to extremely rapid sodium faujasite production if there is a reasonably brief period of ambient aging, but leads to significant yields of Zeolite A when subjected to a single stage of aging at about 100° C.

DESCRIPTION OF PREFERRED EMBODIMENTS

The invention is further clarified by reference to a plurality of examples.

Example I

A commercially available pigment known to be a de-exothermed kaolin and marketed as Freeport Whitetex was employed as the aluminodisilicate. Literature concerning de-exothermed kaolin indicate that this material is prepared by calcining the kaolin at 1010–1050° C. and at conditions providing an amorphous aluminum disilicate substantially free from detectable amounts of crystalline mullite and showing, upon Differential Thermal Analysis, less than 8% of the exotherm of metakaolin. To 666 grams (3 mols) of Freeport Whitetex there was added 156 grams (1 mol) of Alcoa C–31 brand of alumina alpha trihydrate, to provide a mixture in which the silica to alumina ratio was, on a unit mol basis, 1.5. About 19% of the mixture was alumina trihydrate and about 81% was calcined kaolin. A solution was prepared in which the water to sodium hydroxide ratio was 5 to 1 so that the sodium hydroxide concentration was about 16.7% or about 5 molar. About 3 parts of the mixture was added to about 4 parts of the aqueous sodium hydroxide so that the ratio of the dry-blended aluminaceous mixture to water to sodium hydroxide was 4.5/5/1. Expressed in terms of the amount of alumina trihydrate employed, the ratios were about 4.3 parts of de-exothermed kaolin per 7.1 parts of 16.7% sodium hydroxide solution per 1 part of alumina alpha trihydrate. The batter was prepared by stirring the dry-blended alumina trihydrate and de-exothermed kaolin into the aqueous sodium hydroxide. The freshly prepared batter was placed in an oven maintained at about 100° C., the container being covered to prevent gain or loss of moisture. Thus there was no period of ambient aging, but only a single step of hot aging. The samples of product were taken periodically to measure the rate of zeolite formation. Zeolite A was formed quite rapidly, the concentration being near 20% after 5 hours and around 30% by 10 hours. The peak concentration was near 18 hours, but at 20 hours, there was no persuasive evidence of the presence of other zeolite species. After 25 hours aging, the competition of zeolitic products was conspicuous, and by the end of 30 hours, the concentration of sodium faujasite exceeded the concentration of Zeolite A. In a repeat preparation of similar size, the hot aging is terminated after 20 hours, whereby the product contains about 42% Zeolite A in an aluminosilicate matrix without contamination by troublesome amounts of other zeolites. The zeolite is identified by x-ray diffraction after the crude product is purified by water washing, drying, and humidity equilibration.

Example II

A sample of Zeolite A was prepared following the procedure of Example 1 but adhering to proportions of 5.2 parts of the clay mixture per 5 parts of water and 1 part of sodium hydroxide or corresponding to about 6.1 parts of 16.7% sodium hydroxide solution per 1 part of alumina alpha trihydrate. The concentration of Zeolite A in the product at the end of 10 hours and at the end of 20 hours was slightly greater than in Example I.

A sample of Zeolite A was prepared following the procedure of Example I but using proportions of 5.6 parts of the 4.3/1 dry blend, 6.2 parts of water and 1 part of sodium hydroxide. Thus, the concentration of the sodium hydroxide was 13.8%. By a series of experiments, it is shown that Zeolite A can be produced by the use of sodium hydroxide concentrations ranging from about 13.8% to about 17% by weight.

It is surprising that a Zeolite A product having a silica to alumina ratio of 2 should be prepared from a nutrient in which the silica to alumina ratio is only 1.5. Moreover, it is surprising that Zeolite A should be the selectively formed zeolite during the period from about 10 to 20 hours of aging in view of the suitability of the nutrient for preparing other zeolites such as sodium faujasite when following a different temperature programming.

The invention claimed is:

1. In the method in which a kaolin is heated to provide a calcined kaolin, and in which a nutrient composition is prepared by admixing calcined kaolin, water, and sodium hydroxide, and in which Zeolite A is prepared by aging the nutrient composition, the improvement which consists of the combination of: calcining kaolin at an elevated temperature to provide an amorphous de-exothermed kaolin having, on Differential Thermal Analysis, less than 8% of the exotherm of metakaolin, said de-exothermed kaolin being free from significant amounts of detectable mullite; preparing at ambient temperature a nutrient composition consisting of 1 part by weight alumina alpha trihydrate, about 4.3 parts by weight de-exothermed kaolin, and about 6.1 to about 7.1 parts by weight of an aqueous alkaline solution containing from amout 13.8% to about 17% by weight sodium hydroxide; without significant aging at ambient temperature, heating the freshly prepared nutrient to about 100° C.; subjecting the nutrient to aging at 100° C. for a period from about 10 to about 20 hours; and withdrawing as the product of the process and aluminosilicate composition containing significant amounts of Zeolite A in an aluminosilicate matrix.

2. The method of claim 1 in which the nutrient composition contains 6.1 to 7.1 parts by weight of 16.7% sodium hydroxide solution.

References Cited

UNITED STATES PATENTS

| | | | |
|---|---|---|---|
| 2,882,243 | 4/1959 | Milton | 23—113 |
| 2,882,244 | 4/1959 | Milton | 23—113 |
| 3,058,805 | 10/1962 | Weber | 23—113 |
| 3,367,886 | 2/1968 | Haden et al. | 252—455 |
| 3,391,994 | 7/1968 | Haden et al. | 23—112 |
| 3,515,511 | 6/1970 | Flank | 23—112 |
| 3,532,459 | 10/1970 | McEvoy et al. | 23—112 |
| 3,545,921 | 12/1970 | McEvoy | 23—112 |

EDWARD J. MEROS, Primary Examiner

U.S. Cl. X.R.

23—112 R